United States Patent
Chosa

(10) Patent No.: US 7,122,614 B2
(45) Date of Patent: Oct. 17, 2006

(54) AROMATIC POLYCARBONATE RESINS FOR OPTICAL DISK SUBSTRATES

(75) Inventor: Munehiro Chosa, Tokyo (JP)

(73) Assignee: Idemitsu Kosan Co., ltd., Tokyo (JP)

( * ) Notice: Subject to any disclaimer, the term of this patent is extended or adjusted under 35 U.S.C. 154(b) by 0 days.

(21) Appl. No.: 10/501,926

(22) PCT Filed: Feb. 14, 2003

(86) PCT No.: PCT/JP03/01544

§ 371 (c)(1),
(2), (4) Date: Mar. 29, 2005

(87) PCT Pub. No.: WO03/068863

PCT Pub. Date: Aug. 21, 2003

(65) Prior Publication Data

US 2005/0165204 A1    Jul. 28, 2005

(30) Foreign Application Priority Data

Feb. 18, 2002 (JP) .............................. 2002-039757

(51) Int. Cl.
*C08G 64/00* (2006.01)
(52) U.S. Cl. ................... 528/196; 264/176.1; 264/219; 359/109; 359/642; 528/198; 528/199
(58) Field of Classification Search ............. 264/176.1, 264/219; 359/109, 642; 528/196, 198, 199
See application file for complete search history.

(56) References Cited

U.S. PATENT DOCUMENTS

| 5,463,013 | A | * | 10/1995 | Tokuda et al. | ............. 528/196 |
|---|---|---|---|---|---|
| 5,717,055 | A | * | 2/1998 | Hosomi et al. | ............. 528/196 |
| 6,316,071 | B1 | | 11/2001 | Chosa et al. | |
| 6,716,510 | B1 | | 4/2004 | Tomioka et al. | |
| 2004/0142139 | A1 | | 7/2004 | Tomioka et al. | |
| 2004/0143048 | A1 | | 7/2004 | Tomioka et al. | |
| 2004/0147713 | A1 | | 7/2004 | Tomioka et al. | |

FOREIGN PATENT DOCUMENTS

| JP | 2000001608 | * | 1/2000 |
|---|---|---|---|
| JP | 2001-312836 | | 11/2001 |

* cited by examiner

*Primary Examiner*—Terressa Boykin
(74) *Attorney, Agent, or Firm*—Oblon, Spivak, McClelland, Maier & Neustadt, P.C.

(57) ABSTRACT

The present invention provides an aromatic polycarbonate resin product for producing optical disc substrates of high reliability at high molding yield.

The aromatic polycarbonate resin for optical disc substrates is produced by adding 0.015 to 0.05 parts by mass of a $C_{14}$–$C_{30}$ fatty acid monoglyceride to 100 parts by mass of an aromatic polycarbonate resin, adding water having an electric conductivity, as measured at 25° C., of 1 μS/cm or less to the resin, the water content of the resin being controlled to 0.05 to 0.3 mass %, melt-extruding the water-added resin, cooling, and cutting to form pellets, the resin having a viscosity average molecular weight (Mv) of 10,000 to 20,000.

5 Claims, No Drawings

AROMATIC POLYCARBONATE RESINS FOR OPTICAL DISK SUBSTRATES

TECHNICAL FIELD

The present invention relates to an aromatic polycarbonate resin product for producing a high-recording-density optical recording medium which performs writing in, writing in/reading out, reading out, deleting, etc. of information through collection of optical beams. More particularly, the present invention relates to an aromatic polycarbonate resin product having excellent moldability and physical properties for producing optical disc substrates such as compact discs (audio CD, CD-ROM, CD-R, and CD-RW), MOs, MDs, and digital versatile discs (DVD-ROM, DVD-R, DVD-RW, and DVD-RAM).

BACKGROUND ART

Optical disc substrates are produced from a material such as aromatic polycarbonate resin, acrylic resin, epoxy resin, or glass. Among them, plastic resins are generally employed, for reasons such as easy formation of fine molded articles through injection molding and adaptability to large-scale production.

Among these resins, polycarbonate resin is preferably employed, in that it satisfies properties required of optical disc substrates such as strength (e.g., impact strength), transparency, heat resistance, and low water absorption.

Meanwhile, if flashes generate around optical disc substrates during injection molding, they may be scratched off from an optical disc substrate when the optical disc substrate is released or ejected from molds. As the result, they may become floating dusts. These dusts may attach to the surface of the released optical disc substrates, or may attach to the mold and be incorporated into another optical disc substrate which is subsequently molded. Such dusts on the optical disc substrates or inside the optical disc substrates are detected as foreign matters or optical, when they are inspected by disc-inspection scanner. Thus, such dusts may sacrifice the yield of optical disc substrates.

On the other hand, to prevent such flashing from generating and to attain smooth mold releasing, the technique to add the mold-releasing agent into an aromatic polycarbonate resin is known.

For example, Japanese Patent Application Laid-Open (kokai) No. Heisei 10(1998)-60105 discloses an aromatic polycarbonate resin for optical disc substrates, containing a $C_{14}$–$C_{30}$ fatty acid monoglyceride in an amount of 0.06 to 0.1 mass %.

DISCLOSURE OF THE INVENTION

Needless to say, when a $C_{14}$–$C_{30}$ fatty acid monoglyceride is added into an aromatic polycarbonate resin in an amount of 0.06 mass % or more, the molded optical disc substrates can be quite smoothly released from molds.

Meanwhile, an essential task of optical discs serving as a recording medium is to store its recorded data for a long period of time.

The present inventors have made the accelerated deterioration test of optical disc sample through keeping the sample under temperature of 90° C. and 90% relative humidity, so as to check the reliability of the optical disc sample. The test results indicate that, when the amount of the $C_{14}$–$C_{30}$ fatty acid monoglyceride added into an aromatic polycarbonate resin is more than 0.05 mass %, the generation of polarizing opaque defects through hydrolysis of an aromatic polycarbonate resin is not prone to be promoted, but the molecular weight of the resin is prone to be lowered, thereby the reliability of recording medium may be also reduced.

Therefore, the amount of the $C_{14}$–$C_{30}$ fatty acid monoglyceride added into an aromatic polycarbonate resin should be as small as possible, up to the minimum level required as necessary and sufficient level.

However, its amount is excessively small, nebulous marks (so-call "cloud mark") may appear on the surface of optical disc substrates due to poor mold releasing. In a severe case, the marks adversely affect signals (i.e., generate the noises), or flashes may generate, as mentioned above, thereby increasing optical defects.

Thus, in order to satisfy two requirements; to release the molded optical disc substrates from molds smoothly, and to attain the good reliability as a recording medium, it was found that the amount of of the $C_{14}$–$C_{30}$ fatty acid monoglyceride should be controlled within a certain allowable range.

In a method of producing aromatic polycarbonate resin pellets through melt extrusion by use of an extruder, the $C_{14}$–$C_{30}$ fatty acid monoglyceride serving as a mold release agent is degraded to form a fatty acid monoglyceride carbonate, a fatty acid diglyceride, and a fatty acid triglyceride, thereby decreasing releasability of an optical disc substrate upon molding.

In addition, it was found that a fatty acid monoglyceride carbonate, a fatty acid diglyceride or a fatty acid triglyceride might sometimes generate due to denaturing of the $C_{14}$–$C_{30}$ fatty acid monoglyceride serving as a mold-releasing agent during the process for producing resin pellets through extruding melted powder of aromatic polycarbonate resin by using an extruder; thereby decreasing the releasing-ability of optical disc substrates in molding.

The present inventors have found that denaturing of the C14–C30 fatty acid monoglyceride is effectively prevented by adding water to an aromatic polycarbonate resin.

However, the effect varies depending on a certain quality of water added. When the accelerated deterioration test of optical disc sample is made through keeping the sample under temperature of 90° C. and 90% relative humidity; for example, if water added to an aromatic polycarbonate resin has a certain quality, the generation of polarizing opaque defects through hydrolysis of an aromatic polycarbonate resin is prone to be promoted.

The present invention has been conceived under the aforementioned circumstances. Thus, an object of the present invention is to provide a polycarbonate resin for producing an optical disc substrate which has high reliability and high yield in molding.

The present inventors have carried out extensive studies in order to attain the above object, and have found that the aforementioned problems can be solved by adding a $C_{14}$–$C_{30}$ fatty acid monoglyceride to an aromatic polycarbonate resin in an amount falling within a specific range, adding water having a specific electric conductivity to the resin, controlling the water content of the resin so as to fall within a specific range, and extruding the water-added mixture. The present invention has been accomplished on the basis of this finding.

Accordingly, the present invention is directed to the following.

(1) An aromatic polycarbonate resin product for optical disc substrates, the product being produced by adding 0.015 to 0.05 parts by mass of a $C_{14}$–$C_{30}$ fatty acid monoglyceride to 100 parts by mass of an aromatic polycarbonate resin, adding water having an electric conductivity, as measured at 25° C., of 1 μS/cm or less to the resin, the water content of the resin being controlled so as to fall within the range of 0.05 to 0.3 mass %, melt-extruding the water-added resin, cooling, and cutting to form pellets, the resin having a viscosity average molecular weight (Mv) of 10,000 to 20,000.

(2) An aromatic polycarbonate resin product for optical disc substrates according to (1) above, wherein the melt-extruded aromatic polycarbonate resin is cooled by use of water having an electric conductivity, as measured at 25° C., of 1 μS/cm or less.

(3) An aromatic polycarbonate resin product for optical disc substrates according to (1) above, wherein the aromatic polycarbonate resin has terminal groups in which p-cumylphenoxy group and/or p-tert-octylphenoxy group account for 30 mol % or more.

(4) An aromatic polycarbonate resin product for optical disc substrates according to any of (1) to (3) above, wherein the aromatic polycarbonate resin has a viscosity average molecular weight (Mv) of 11,000 to 18,000. An aromatic (5) An aromatic polycarbonate resin product for optical disc substrates according to any of (1) to (3) above, wherein the aromatic polycarbonate resin has a viscosity average molecular weight (Mv) of 12,000 to 16,000.

(6) An aromatic polycarbonate resin product for optical disc substrates according to any of (1) to (3) above, which contains a fatty acid monoglyceride in an amount of 0.02 to 0.04 parts by mass.

(7) An aromatic polycarbonate resin product for optical disc substrates according to any of (1) to (3) above, wherein the fatty acid monoglyceride is stearic acid monoglyceride.

(8) An aromatic polycarbonate resin product for optical disc substrates according to any of (1) to (3) above, wherein the water content of the resin is controlled so as to fall within the range of 0.05 to 0.3 mass %.

BEST MODE FOR CARRYING OUT THE INVENTION

The present invention will be described in detail, as follows.

According to the present invention, an aromatic polycarbonate resin having terminal groups in which p-cumylphenoxy group and/or p-tert-octylphenoxy group account 30 mol % or more and having a viscosity average molecular weight (Mv) of 10,000 to 20,000 is preferably employed. The viscosity average molecular weight (Mv) is preferably 11,000 to 18,000, more preferably 12,000 to 16,000.

No particular limitation is imposed on the basic structure of the aromatic polycarbonate resin, and any of various polycarbonate resins can be employed.

Generally, an aromatic polycarbonate which is produced through reaction of a dihydric phenol and a carbonate precursor can be employed.

Specifically, an aromatic polycarbonate produced through reaction of a dihydric phenol and a carbonate precursor such as phosgene in a solution can be employed. Alternatively, an aromatic polycarbonate produced through transesterification between a dihydric phenol and diphenyl carbonate or a similar substance can be employed.

A variety of dihydric phenols may be used. Specific examples include 2,2-bis(4-hyroxyphenyl)propane [bisphenol A], bis(4-hydroxyphenyl)methane, 1,1-bis(4-hydroxyphenyl)ethane, 2,2-bis(4-hydroxy-3,5-dimethylphenyl) propane, 4,4'-dihydroxydiphenyl, bis(4-hydroxyphenyl) cycloalkane, bis(4-hydroxyphenyl) oxide, bis(4-hydroxyphenyl) sulfide, bis(4-hydroxyphenyl) sulfone, bis(4-hydroxyphenyl) sulfoxide, bis(4-hydroxyphenyl) ether, and bis(4-hydroxyphenyl) ketone.

Examples of other dihydric phenols include hydroquinone, resorcin, and catechol.

These dihydric phenols may be used singly or in combination of two or more species.

Among dihydric phenols, bis(hydroxyphenyl)alkane compounds are preferred as dihydric phenols, with bisphenol A and a compound produced from bisphenol A as a predominant starting material being particularly preferred.

Examples of the carbonate precursor include carbonyl halides, carbonyl esters, and haloformates. Specific examples include phosgene, dihydric phenol dihaloformates, diphenyl carbonate, dimethyl carbonate, and diethyl carbonate.

Notably, the polycarbonate resin may have a branch structure. Examples of branch-forming agents include 1,1, 1-tris(4-hydroxyphenyl)ethane, α, α', α"-tris(4-hydroxyphenyl)-1,3,5-triisopropylbenzene, phloroglucin, trimellitic acid, and isatinbis(o-cresol).

The aromatic polycarbonate resin employed in the present invention may be a copolymer having a polycarbonate moiety and a polyorganosiloxane moiety or an aromatic polycarbonate resin including the copolymer.

Alternatively, the aromatic polycarbonate resin may be a polyester-polycarbonate resin which is produced through polymerization for forming polycarbonate in the presence of a bi-functional carboxylic acid such as terephthalic acid or an ester precursor such as an ester derivative of the bi-functional carboxylic acid.

The aromatic polycarbonate resin employed in the present invention preferably has a specific terminal group and a viscosity average molecular weight (Mv) within a specific range.

Modification of terminal groups of the aromatic polycarbonate resin may be performed generally by use of any of a variety of phenols, which serve as end-capping agent in the polymerization for polycarbonate resin.

Specific examples of the aforementioned phenols include phenol, dimethylphenol, p-tert-butylphenol, 2,6-dimethyl-4-tert-butylphenol, p-tert-octylphenol, and p-cumylphenol.

Accordingly, the aromatic polycarbonate resin has a terminal group formed through reaction with an end-capping agent and a terminal group of bisphenol A serving as a dihydric phenol moiety.

In the present invention, the terminal groups are preferably composed of p-cumylphenoxy group and/or p-tert-octylphenoxy group in an amount of 30 mol % or more, based on the total terminal groups, more preferably 70 mol % or more, most preferably 90 mol % or more, the p-cumylphenoxy group and the p-tert-octylphenoxy group being formed through reaction with p-cumylphenoxy group and/or p-tert-octylphenoxy group.

Accordingly, the aromatic polycarbonate resin employed in the present invention is an aromatic polycarbonate resin having a p-cumylphenoxy group, an aromatic polycarbonate resin having a p-tert-octylphenoxy group, or a mixture thereof with an aromatic polycarbonate resin having another phenoxy group. The amount of p-cumylphenoxy groups and/or p-tert-octylphenoxy groups is preferably controlled to 30 mol % or more, based on the total terminal groups in the aromatic polycarbonate resin.

One preferred aromatic polycarbonate resin employed in the present invention has a main chain represented by formula (I):

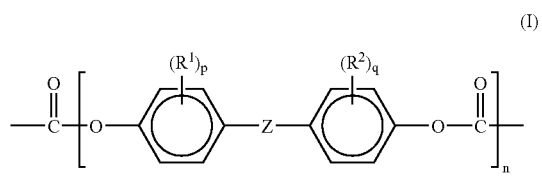

(wherein each of $R^1$ and $R^2$, which may be identical to or different from each other, represents a halogen atom, a $C_1$–$C_6$ alkyl group, or a phenyl group; Z represents a single bond, a $C_1$–$C_{20}$ alkylene or alkylidene group, a $C_5$–$C_{20}$ cycloalkylene or cycloalkylidene group, —O—, —S—, —SO—, $SO^2$—, or —CO—; each of p and q is an integer of 0 to 4, and n is the number of repeated units), as well as a hydroxyl group or a terminal group represented by formula (II):

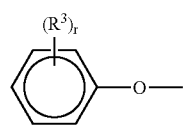

(wherein $R^3$ represents a halogen atom, a $C_1$–$C_{20}$ alkyl group, or a $C_6$–$C_{20}$ aryl group, and r is an integer of 0 to 5), wherein at least 30 mol % the terminal groups are composed of the groups represented by formula (III) and/or the groups represented by formula (IV).

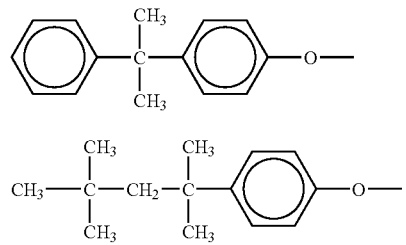

In the aromatic polycarbonate resin represented by formula (I) employed in the present invention, each $R^1$ and $R^2$ is preferably a halogen atom, a $C_1$–$C_6$ alkyl group, or a phenyl group.

Examples of the halogen atom include chlorine, bromine, fluorine, and iodine. The $C_1$–$C_6$ alkyl group may be linear, branched, or cyclic, and examples include methyl, ethyl, n-propyl, isopropyl, n-butyl, isobutyl, tert-butyl, amyl, isoamyl, hexyl, isohexyl, and cyclohexyl.

$R^1$ and $R^2$ may be identical to or different from each other.

In the case where a plurality of $R^1$ or a plurality of $R^2$ are present in formula (I), $R^1$s may be identical to or different from one another, and $R^2$s may be identical to or different from one another. Each of p and q is an integer of 0 to 4.

Z represents a single bond, a $C_1$–$C_{20}$ alkylene or alkylidene group, a $C_5$–$C_{20}$ cycloalkylene or cycloalkylidene group, —O—, —S—, —SO—, $SO^2$—, or —CO—; each of p and q is an integer of 0 to 4, and n is the number of repeated units.

Examples of the C1–C20 alkylene or alkylidene group include methylene, ethylene, propylene, butylene, pentylene, hexylene, ethylidene, and isopropylidene.

Examples of the $C_4$–$C_{20}$ cycloalkylene or cycloalkylidene group include cyclopentylene, cyclohexylene, and cyclohexylidene.

The "n" is a number for imparting the aromatic polycarbonate resin to a viscosity average molecular weight of 10,000 to 20,000.

The aromatic polycarbonate resin employed in the present invention has a hydroxyl group or a terminal group represented by formula (II). In formula (II), $R^3$ is preferably a halogen atom, a $C_1$–$C_{20}$ alkyl group, or a $C_6$–$C_{20}$ aryl group.

Examples of the halogen atom include chlorine, bromine, fluorine, and iodine. The $C_1$–$C_{20}$ alkyl group may be linear, branched, or cyclic, and examples include methyl, ethyl, n-propyl, isopropyl, n-butyl, isobutyl, sec-butyl, tert-butyl, pentyl, hexyl, octyl, decyl, dodecyl, cyclopentyl, and cyclohexyl.

The $C_6$–$C_{20}$ aryl group may have no substituent on the aromatic ring or may have an appropriate substituent such as a lower alkyl group.

Examples of the aryl group include phenyl, tolyl, xylyl, naphthyl, and methylnaphthyl.

The "r" is an integer of 0 to 5. In the case where a plurality of $R^3$ are present in formula (II), $R^3$s may be identical to or different from one another.

The aromatic polycarbonate resin may have a single species or a plurality of species of terminal groups represented by formula (II).

In other words, p-cumylphenoxy groups and/or p-tert-octylphenoxy groups represented by formula (III) or (IV) preferably account 30 mol % or more, based on the total terminal groups.

In addition to the two types of terminal groups, a p-tert-butylphenoxy group and/or a phenoxy group is preferred. A small amount of hydroxyl groups may be included.

The aromatic polycarbonate resin employed in the present invention suitably has a viscosity average molecular weight (Mv) of 10,000 to 20,000, preferably 11,000 to 18,000, more preferably 12,000 to 16,000.

When the viscosity average molecular weight (Mv) is less than 10,000, strength, particularly impact strength, is insufficient. Thus, a thin substrate having a thickness of 0.6 mm is difficult to mold, and the formed substrate may have poor strength, rendering it unsuitable for practical use.

When the molecular weight is in excess of 20,000, a sufficient impact strength is attained. However, formability of thin substrates and transferability of micro-groove patterns of a stamper are impaired, thereby deteriorating optical properties of substrates such as birefringence. Thus, optical disc substrates of satisfactory performance may be difficult to produce.

The viscosity average molecular weight (Mv) of the aromatic polycarbonate resin employed in the present invention is determined in accordance with the following procedure. An aromatic polycarbonate resin (about 0.7 g) is dissolved in methylene chloride (100 cc) at 20° C., and the specific viscosity ($\eta_{sp}$) of the solution is determined by means of an Ubbelohde viscometer. The Mv is calculated by inputting the specific viscosity value in accordance with the following equations:

$$(\eta_{sp})/C = [\eta] + 0.45 \times [\eta]^2 C$$

$$[\eta] = 1.23 \times 10^{-5} Mv^{0.83}$$

(wherein [η] represents intrinsic viscosity, and C represents polymer concentration).

Mechanical characteristics (e.g., impact strength) and other physical properties (e.g., moldability and optical properties), which are conflicting requirements, must be satisfied.

Therefore, the viscosity average molecular weight (Mv) of the aromatic polycarbonate resin is preferably lowered, so long as substrate characteristics such as impact strength are satisfied.

As compared with generally employed polycarbonate having a phenoxy group or a p-tert-butylphenoxy group, the aromatic polycarbonate resin having a specific terminal group, which resin is employable in the present invention, maintains sufficiently high falling ball impact strength at a considerably low viscosity average molecular weight, as confirmed from the relationship between viscosity average molecular weight (i.e., melt viscosity) and falling ball impact strength (practical physical property).

Furthermore, by adding the mold releasing agent described below and controlling the amount thereof, optical disc substrate of excellent optical characteristics can be molded under high cycle conditions.

The aromatic polycarbonate resin employed in the present invention preferably contains hydroxyl groups accounting for 1 mol % or less the total terminal groups, more preferably 0.3 mol % or less.

Chlorine, sodium, and other micro-particulate impurities (substances not dissolved in methylene chloride) contained in the aromatic polycarbonate resin are preferably decreased to as small an amount as possible through purification/removal means such as washing, filtration, and centrifugation, through a step such as melt-kneading degassing, or similar means.

The aromatic polycarbonate resin preferably contains a low-molecular-weight component (Soxhlet extraction component in acetone), generally in an amount of 10 mass % or lower.

The aromatic polycarbonate resin product for optical disc substrates of the present invention must contain a $C_{14}$–$C_{30}$ fatty acid monoglyceride in an amount falling within a specific range.

The $C_{14}$–$C_{30}$ fatty acid monoglyceride is a monoester compound formed from a $C_{14}$–$C_{30}$ fatty acid and glycerin. Examples of the monoglyceride include palmitic acid monoglyceride, stearic acid monoglyceride, arachic acid monoglyceride, behenic acid monoglyceride, and montanic acid monoglyceride. A mixture thereof may also be employed.

The fatty acid monoglyceride is preferably stearic acid monoglyceride or behenic acid monoglyceride, from the viewpoint of the releasing-ability of optical disc substrates in molding. Of these, stearic acid monoglyceride is particularly preferred.

The fatty acid monoglyceride preferably has a low impurity (e.g., sodium or chlorine) content, from the viewpoint of long-term reliability of recording medium produced from the aromatic polycarbonate resin particularly under high temperature and high humidity conditions.

For example, the sodium content is preferably 30 ppm by mass or less, more preferably 20 ppm by mass or less.

The fatty acid monoglyceride is contained in an amount of 0.015 to 0.05 parts by mass, preferably 0.020 to 0.04 parts by mass.

When the amount of fatty acid monoglyceride is less than 0.015 parts by mass, mold releasing-ability of optical disc substrates in molding may become become poor, and cloud marks may easily generate on the surface of optical disc substrates.

When the amount of fatty acid monoglyceride is in excess of 0.05 parts by mass, the molecular weight of the aromatic polycarbonate resin may be decreased during molding, thereby sacrificing the reliability of recording medium.

The aromatic polycarbonate resin product for optical disc substrates of the present invention is required to be added water of a specific quality and to contain water in a specific amount for carrying out melt-extrusion.

Regarding to quality, the water has an electric conductivity, as measured at 25° C., of 1 μS/cm or less.

When the electric conductivity exceeds 1 μS/cm, the generation of polarizing opaque defects through hydrolysis of aromatic polycarbonate resin is promoted, thereby sacrificing the reliability of recording medium.

The aromatic polycarbonate resin product contains water having an electric conductivity, as measured at 25° C., of 1 μS/cm or less in an amount of 0.05 to 0.3 mass %, preferably 0.05 to 0.2 mass %.

When the amount is less than 0.05 mass %, a fatty acid monoglyceride carbonate, a fatty acid diglyceride or a fatty acid triglyceride generates due to denaturing of the $C_{14}$–$C_{30}$ fatty acid monoglyceride serving as a mold-releasing agent, thereby sacrificing the releasing-ability of optical disc substrates in molding.

When the amount is in excess of 0.3 mass %, the hydrolysis of the polycarbonate resin may be sometimes promoted, or the melt-extrusion process may become unstable, thereby sacrificing the production-capacity.

When the melt extruded aromatic polycarbonate resin is cooled by use of water having an electric conductivity, as measured at 25° C., of 1 μS/cm or less, scratching such as crazing does not occur on an optical disc substrates, thereby further enhancing quality of the optical disc substrates.

The aromatic polycarbonate resin product for optical disc substrate of the present invention may further contain additional additives such as stabilizers and colorants in accordance with needs, in amounts being within a range so as not to sacrifice the scope of the present invention.

A phosphorus-containing stabilizer such as a phosphite ester or a phosphate ester is preferably employed as the stabilizer.

Examples of the phosphite ester include phosphite triesters, phosphite diesters, and phosphite monoesters. Specific examples include triphenyl phosphite, tris(nonylphenyl) phosphite, tris(2,4-di-tert-butylphenyl) phosphite, trinonyl phosphite, tridecyl phosphite, trioctyl phosphite, trioctadecyl phosphite, distearylpentaerythritol diphosphite, tricyclohexyl phosphite, monobutyl diphenyl phosphite, monooctyl diphenyl phosphite, bis(2,6-di-tert-butyl-4-methylphenyl)pentaerythritol diphosphite, 2,2-methylenebis(4,6-di-tert-butylphenyl) octyl phosphite, and tetrakis(2,4-di-tert-butylphenyl)-4,4-diphenylene phosphonite.

Of these, tris(nonylphenyl) phosphite, tris(2,4-di-tert-butylphenyl) phosphite, distearylpentaerythritol diphosphite, etc. are preferred.

Examples of the phosphate ester include trimethyl phosphate, triethyl phosphate, tributyl phosphate, trioctyl phosphate, triphenyl phosphate, tricresyl phosphate, tri(nonylphenyl) phosphate, and 2-ethylphenyl diphenyl phosphate.

These phosphorus-containing stabilizers may be used singly or in combination of two or more species.

The phosphorus-containing stabilizer content appropriately falls within a range of 0.001 to 0.02 mass % as reduced to phosphorus atom content.

When the stabilizer content is less than 0.001 mass %, the stabilization effects on the polycarbonate resin become poor, whereas when the content is in excess of 0.02 mass %, the reliability of recording medium for long period of time may be sacrificed.

Thus, the phosphorus-containing stabilizer content is preferably limited to a minimum level for assuring thermal stability of the resin during production of pellets and during molding of optical disc substrates.

The aromatic polycarbonate resin product for optical disc substrates of the present invention is produced by adding, to a aromatic polycarbonate resin, a specific amount of a $C_{14}$–$C_{30}$ fatty acid monoglyceride and, if required, an optional additive to an aromatic polycarbonate resin, adding water having an electric conductivity, as measured at 25° C., of 1 μS/cm or less to the resin, and melt-kneading the water-added mixture while the water content of the resin is controlled to 0.05 to 0.3 mass %, to thereby obtain pellets.

The pellets as raw materials are melt-extruded, to thereby form an aromatic polycarbonate resin product for optical disc substrates.

During molding, ultrasound may be applied to a mold.

Molding conditions include resin temperature of 340 to 400° C., preferably 350 to 390° C., and mold temperature of 80 to 140° C., preferably 90 to 130° C.

Under the above temperature conditions, the molten resin is injection-molded by use of a mold having a cavity (diameter: 120 mm, thickness: 0.6 mm) and a stamper.

The molding cycle is generally 3 to 10 sec, preferably 3 to 9 sec.

EXAMPLES

Production Example of Aromatic Polycarbonate Resin

PC-A:

Bisphenol A (60 kg) was dissolved in a 5 mass % aqueous sodium hydroxide solution (400 L), to thereby prepare an aqueous bisphenol A sodium hydroxide solution.

Subsequently, the aqueous bisphenol A sodium hydroxide solution maintained at room temperature and methylene chloride were fed to a tube reactor (inner diameter: 10 mm, tube length: 10 m) through an orifice plate at a flow of 138 L/hour and 69 L/hour, respectively. In addition, phosgene was fed into the reactor at a flow of 10.7 kg/hour. The reaction was continuously carried out for three hours.

The temperature of the discharged reaction mixture was adjusted to at 25° C., and the pH of the discharged liquid was adjusted at 10 to 11. The thus-obtained reaction mixture was allows to stand, and the water phase was removed from the mixture. The methylene chloride phase (220 L) was collected, to thereby yield a polycarbonate oligomer.

p-Cumylphenol (166.7 g) was dissolved in the above polycarbonate oligomer (10 L). Subsequently, an aqueous sodium hydroxide solution (sodium hydroxide 75 g and water 1.0 L) and triethylamine (1.17 mL) were added to the solution, and the mixture was stirred at 300 rpm for 30 minutes at ambient temperature.

Subsequently, a solution of bisphenol A dissolved in aqueous sodium hydroxide solution (bisphenol A: 607 g, sodium hydroxide 320 g, and water: 5 L) and methylene chloride (8 L) were added to the above reaction system. The mixture was stirred at 500 rpm for one hour at ambient temperature.

After completion of reaction, methylene chloride (5 L) and water (5 L) were added to the reaction mixture, followed by stirring at 500 rpm for 10 minutes at room temperature. After termination of stirring, the reaction mixture was allowed to stand so as to separate the organic phase from the aqueous phase.

The collected organic phase was sequentially washed with an alkali medium (0.03N aqueous NaOH) (5 L), an acid (0.2N aqueous hydrochloric acid) (5 L), water (5 L), and water (5 L). Through evaporation of methylene chloride and drying, an aromatic polycarbonate resin (A) in the form of flakes was produced.

Through NMR measurement, almost 100 mol % the terminal groups were found to be p-cumylphenoxy groups.

PC-B:

The procedure of the aforementioned production of PC-A was repeated, except that p-tert-octylphenol (162.0 g) was used instead of p-cumylphenol (166.7 g), to thereby produce an aromatic polycarbonate resin (B).

Almost 100 mol % the terminal groups were found to be p-tert-octylphenoxy groups.

PC-C:

The procedure of the aforementioned production of PC-A was repeated, except that p-tert-butylphenol (118.0 g) was used instead of p-cumylphenol (166.7 g), to thereby produce an aromatic polycarbonate resin (C).

Almost 100 mol % the terminal groups were found to be p-tert-butylphenoxy groups.

The present invention will next be described in detail by way of Examples and Comparative Examples, which should not be construed as limiting the invention thereto.

Examples 1 and 4, and Comparative Examples 1 to 3

Aromatic polycarbonate resin PC-A was blended with stearic acid monoglyceride (hereinafter may be abbreviated as SM) (0.028 parts by mass), tris(2,4-di-tert-butylphenyl) phosphite (0.004 mass %), and a predetermined amount of water having an electric conductivity, as measured at 25° C., of 0.9 μS/cm. The mixture was melt-kneaded by means of a twin-screw extruder at 255° C., to thereby produce aromatic polycarbonate resin pellets for molding optical disc substrates.

The pellets were molded by use of a mold [diameter: 120 mm, thickness: 0.6 mm, pit depth of DVD-ROM stamper: 140 nm] under the following conditions: resin temperature of 370° C., mold temperature of 100° C., and molding cycle of 5.3 sec, to thereby produce optical disc substrates. Experimental conditions are shown in Table 1-1.

The optical disc substrates produced by molding the aromatic polycarbonate resin product were evaluated in terms of the following properties. The results are shown in Table 1-2.

1. The Percent Amount of Stearic Acid Monoglyceride (SM) Remaining in Aromatic Polycarbonate Resin Pellets When no water was added to the aromatic polycarbonate resin, stearic acid monoglyceride was confirmed to form degraded products such as stearoyloxyethylene carbonate, stearic acid diglyceride, and stearic acid triglyceride.

2. Releasability: Molding Conditions Were Visually Observed.
- ○: smoothly released without any problems
- Δ: released with some problem
- ×: unsuccessful release Notably, the rating "released with some problem" refers to the state that a robot failed to remove an optical disc substrate from a mold due to poor releasability of the optical disc substrate or a sprue, causing the molding machine to stop.

3. Resistance to Heat and Moisture

The produced optical disc substrates were subjected to an accelerated deterioration test (1,000 h) under the following constant conditions: a temperature of 90° C. and 90% humidity. Thereafter, the discs were evaluated in terms of viscosity average molecular weight.

As is clear from Table 1-2, when the amount of water having an electric conductivity, as measured at 25° C., of 0.9 μS/cm falls within a specific range, stearic acid monoglyceride serving as a mold releasing agent is not degraded, and excellent mold releasability is attained.

In addition, the above discs have excellent resistance to heat and moisture. Since the aromatic polycarbonate resin does not undergo hydrolysis, high reliability of information recording is clearly assured.

Example 2

The procedure of Example 1 was repeated, except that aromatic polycarbonate resin PC-B was used instead of aromatic polycarbonate resin PC-A, to thereby produce aromatic polycarbonate resin pellets. Optical disc substrates were molded from the pellets.

Experimental conditions are shown in Table 1-1, and evaluation results are shown in Table 1-2.

Example 3

The procedure of Example 1 was repeated, except that aromatic polycarbonate resin PC-C was used instead of aromatic polycarbonate resin PC-A, to thereby produce aromatic polycarbonate resin pellets. Optical disc substrates were molded from the pellets.

Experimental conditions are shown in Table 1-1, and evaluation results are shown in Table 1-2.

Example 5 and Comparative Examples 4 to 7

Aromatic polycarbonate resin PC-A was employed, but no stearic monoglyceride was added to the resin. Resin pellets for producing optical disc substrates were produced in a manner similar to that of Example 1.

To the pellets (100 g), water (1 mL) having a different electric conductivity at 25° C. was added. The mixture was press-molded (press temperature: 230° C., maximum pressure: 100 kg/cm$^2$), to produce optical disc substrates (about 100 mmφ, 0.5 mm thickness). The discs were subjected to an accelerated deterioration test (100 h) by use of a thermo-moisture-stat bath (product of TABAI-ESPEC) under the following conditions: a temperature of 90° C. and 90% RH.

After completion of the test, each optical disc substrate was observed under an optical polarizing microscope so as to count the number of polarizing opaque defects generated through hydrolysis of aromatic polycarbonate resin.

The evaluation results are shown in Table 2.

As is clear from Table 2, water having an electric conductivity, as measured at 25° C., of 1 μS/cm or less must be employed.

TABLE 1-1

| | Composition of raw material | | | Water content | |
|---|---|---|---|---|---|
| | Polycarbonate (PC) | | SM | of PC before addition of | Water added to |
| | Type | Mol. wt. | content ppm | water ppm | PC ppm |
| Ex. 1 | PC-A | 14,200 | 280 | 400 | 1,000 |
| Ex. 2 | PC-B | 14,200 | 280 | 400 | 1,000 |
| Ex. 3 | PC-C | 14,200 | 280 | 400 | 1,000 |
| Ex. 4 | PC-A | 14,000 | 280 | 400 | 800 |
| Comp. Ex. 1 | PC-A | 14,200 | 280 | 400 | — |
| Comp. Ex. 2 | PC-B | 14,200 | 280 | 400 | — |
| Comp. Ex. 3 | PC-C | 14,200 | 280 | 400 | — |

TABLE 1-2

| | Amount of Stearic Monoglyceride remaining in pellets | | Molding-ability | | Resistance aginst heat moisture | | |
|---|---|---|---|---|---|---|---|
| | S.M. ppm | Products deriving from denatured S.M. ppm | Releasing ability | yield | Mol. wt. before treatment (Mv) | Mol. wt. after treatment (Mv) | ΔMv |
| Ex. 1 | 250 | 0 | ○ | 99 | 14,200 | 14,200 | 0 |
| Ex. 2 | 210 | 0 | ○ | 97 | 14,200 | 14,100 | 100 |
| Ex. 3 | 220 | 0 | ○ | 98 | 14,200 | 14,200 | 0 |
| Ex. 4 | 220 | trace | ○ | 98 | 14,000 | 13,900 | 100 |
| Comp. Ex. 1 | 40 | 140 | X | 84 | 14,200 | 14,000 | 200 |
| Comp. Ex. 2 | 50 | 110 | X | 93 | 14,200 | 14,000 | 200 |
| Comp. Ex. 3 | 30 | 120 | X | 96 | 14,200 | 13,900 | 300 |

TABLE 2

|  | Electric conductivity of water added | No. of polarizing opaque defects generated in substrate (n = 5) |
|---|---|---|
| Ex. 5 | 0.9 μS/cm | 10 |
| Comp. Ex. 4 | 11 μS/cm | 100 |
| Comp. Ex. 5 | 100 μS/cm | 1,000 |
| Comp. Ex. 6 | 1 mS/cm | 10,000 |
| Comp. Ex. 7 | 100 mμS/cm | many, not measurable |

INDUSTRIAL APPLICABILITY

According to the present invention, reliability of optical disc substrates with respect to long-term storage of data is enhanced.

In addition, since molding conditions upon melt extrusion can be selected from a wider range, molding cycle and productivity (improvement of molding yield) are enhanced, thereby lowering costs.

The invention claimed is:

1. An aromatic polycarbonate resin product for optical disc substrates, the product being produced by adding 0.015 to 0.05 parts by mass of stearic acid monoglyceride to 100 parts by mass of an aromatic polycarbonate resin, adding water having an electric conductivity, as measured at 25° C., of 1 μS/cm or less to the resin, the water content of the resin being controlled so as to fall within the range of 0.05 to 0.2 mass %, melt-extruding the water-added resin, cooling, and cutting to form pellets, the resin having a viscosity average molecular weight (Mv) of 10,000 to 20,000, wherein the melt-extruded aromatic polycarbonate resin is cooled by use of water having an electric conductivity, as measured at 25° C., of 1 μS/cm or less.

2. An aromatic polycarbonate resin product for optical disc substrates according to claim 1, wherein the aromatic polycarbonate resin has terminal groups in which p-cumylphenoxy group and/or p-tert-octylphenoxy group account for 30 mol % or more.

3. An aromatic polycarbonate resin product for optical disc substrates according to any of claims 1 or 2, wherein the aromatic polycarbonate resin has a viscosity average molecular weight (Mv) of 11,000 to 18,000.

4. An aromatic polycarbonate resin product for optical disc substrates according to any of claims 1 or 2, wherein the aromatic polycarbonate resin has a viscosity average molecular weight (Mv) of 12,000 to 16,000.

5. An aromatic polycarbonate resin product for optical disc substrates according to any of claims 1 or 2, which contains a fatty acid monoglyceride in an amount of 0.02 to 0.04 parts by mass.

* * * * *